United States Patent

[11] 3,630,803

[72] Inventor Gerhard Printz
 Vienna, Austria
[21] Appl. No. 793,427
[22] Filed Jan. 23, 1969
[45] Patented Dec. 28, 1971
[73] Assignee Semperit Osterreichisch-Amerikanische
 Gummiwerke Aktiengesellschaft
 Vienna, Austria

[54] PROCESSES AND DEVICES FOR JOINING FABRIC STRIPS
 10 Claims, 3 Drawing Figs.
[52] U.S. Cl................................................... 156/266,
 156/512, 156/405
[51] Int. Cl..................................................... B32b 25/10
[50] Field of Search........................................... 156/266,
 258, 512, 405; 198/19; 23/203; 271/35

[56] References Cited
 UNITED STATES PATENTS

| | | | |
|---|---|---|---|
| 2,962,083 | 11/1960 | Hasselquist.................... | 198/19 |
| 3,193,282 | 7/1965 | Stewart......................... | 271/35 |
| 3,235,433 | 2/1966 | Cracho et al. ................ | 23/203 |
| 2,902,082 | 9/1959 | Watson et al. ................ | 156/405 X |
| 3,141,805 | 7/1964 | Gough et al. ................. | 156/512 X |
| 3,192,094 | 6/1965 | Phillips et al. ................ | 156/512 X |

*Primary Examiner*—Benjamin A. Borchelt
*Assistant Examiner*—Daniel A. Bent
*Attorney*—Ernest F. Marmorek ABSTRACT: The instant invention concerns a process and a machine for overlapping and in the overlapped position joining single cut strips. The process is carried out with the aid of a conveyor belt and transport means; the transport means transport the strips to a position below the conveyor belt whereupon at least a portion of the conveyor belt is depressed thereby causing the strips thereunder to adhere thereto; subsequently the belt with the strips adhered thereon is raised and the transport means is activated so as to bring in alignment with the belt a next strip which can overlap the just lifted strip; the two overlapping strips are then pressed together and are subsequently removed from the machine. The machine for carrying out the aforesaid process is comprised of transport means which are operative to move the cut strips, a conveyor belt disposed above the transport means and adhesion generating means disposed near the conveyor belt and operative to impart an adhesive effect to a lower portion of said belt. There is also provided lifting means for transporting the strips and roller means to press the strips together.

PATENTED DEC 28 1971 3,630,803

*INVENTOR.*
GERHARD PRINTZ

PROCESSES AND DEVICES FOR JOINING FABRIC STRIPS

Reference is had to my copending application, Ser. No. 795,216, filed on Jan. 30, 1969.

The invention relates to processes for joining single fabric strips on a cutting machine, and is particularly concerned with the joining of diagonally cut flanks of rubberized fabric or the like, with a small overlap the cut flank being lifted by the underside of a suction device and then deposited when the suction is cut off. The invention also relates to devices for carrying out the process.

Processes and devices of this kind are already known. In these, the flanks cut by a cutting device are, for example, lifted and guided over a reception table, on which they are placed by cutting off the suction. The suction nozzle is arranged at the free end of an arm which is mounted to pivot about a horizontal axis. After picking up the flank, the arm is pivoted through 90°; thereafter the flank is deposited on a conveyor belt and is transported through a distance such that the next flank to be deposited overlaps it a little. This system requires a great deal of space, which is dependent upon the length of the arm, which in turn is dependent upon the size of the flank. Moreover, the system is very expensive due to its complicated construction.

The invention consists in a process for joining single fabric strips on a cutting machine, with a small overlap, the cut flanks being lifted by the underside of a suction device and then deposited when the suction is cut off, wherein each cut flank is sucked by means of the suction device to the underside of a conveyor belt whose transport direction is parallel to the cut edge of the flank, whereafter the flank is transported by the conveyor belt for such a distance that a predetermined overlap remains relative to the next flank, and the next flank is then brought under said conveyor belt by the conveyor device of the cutting machine to a position in which it underlaps the previous flank, to which it is pressed by means of rollers.

The invention further consists in a device for carrying out this process, comprising a conveyor belt which can be put under suction by a suction fan and runs parallel to the cutting line, means for cutting off the suction and means for moving the underside of said belt in a direction perpendicular to the plane of the cut flanks.

An exemplary embodiment of a device for carrying out the process of the invention will now be described with reference to the accompanying drawings in which.

Figure 1:
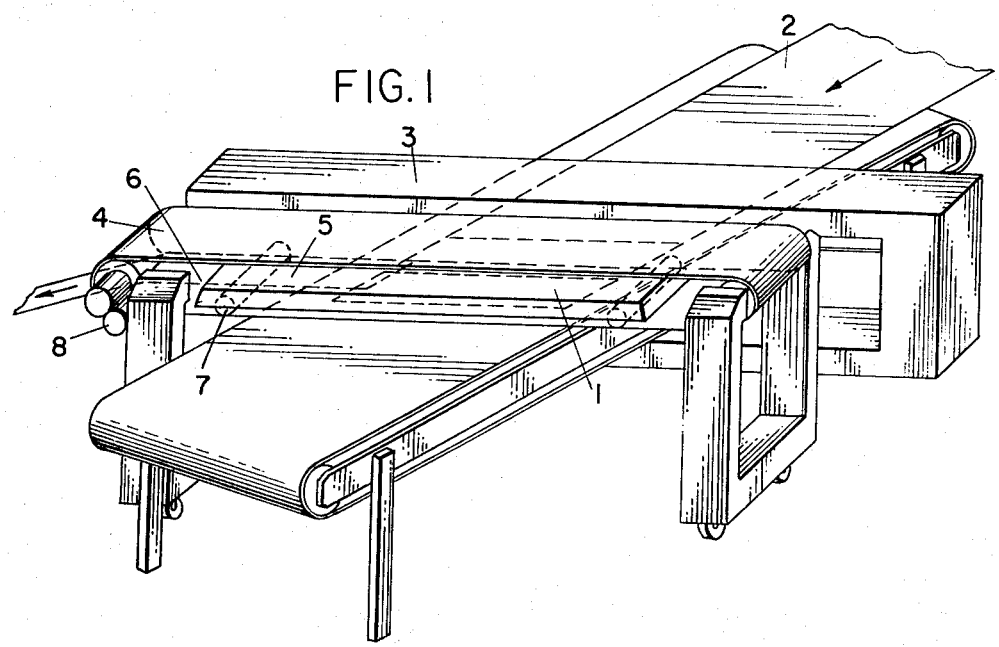
FIG. 1 is a perspective view of the device in association with a horizontal cutting machine and FIG. 2 shows the device in accordance with FIG. 1 in schematic fashion from the front.
Figure 2:
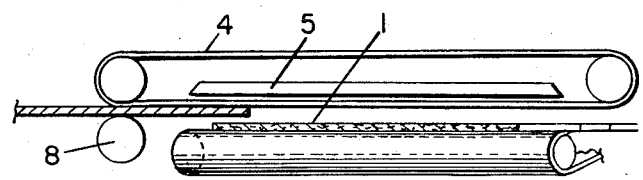

In the horizontal cutting machine illustrated in the figures, one or a number of cut and separated flanks 1 are passed intermittently by a moving belt 2 under a perforated conveyor belt 4 which is arranged parallel to the cutting beam 3 and is held under vacuum by a suction device 5. After the pass has been made, rollers 7 in the interior 6 of the belt are pivoted downwards by pistons on the command of a switching element (not shown) operated by the cutting machine, and these rollers press the conveyor belt 4, which at this time is stationary, on to the cut flank 1 for a short time. Due to the vacuum, the flank now remains sucked on to the conveyor belt 4 after the pivoting back of the rollers 7, and is now transported by the belt until the end of the flank 1 extends by a few millimeters over the beginning of the next flank.

Figure 3:
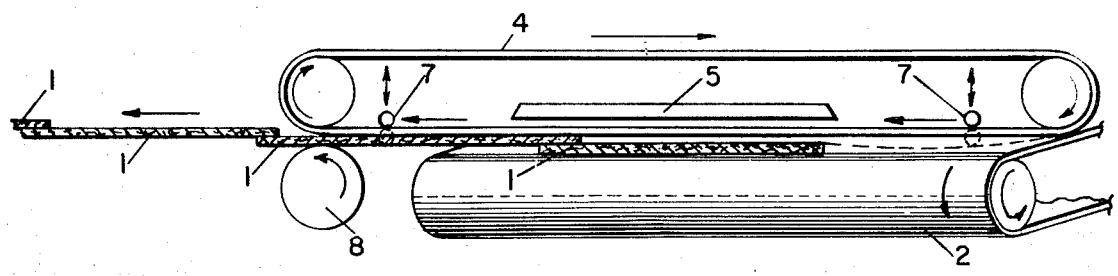
FIG. 3 is a side elevational view partly in section similar to FIG. 2.

As best shown in FIG. 3, the rollers 7 can be pivoted upwards and downwards, as indicated by the vertical arrows. The rollers 7 thus form lifting means to change the distance between the lower portion of the belt 4 and the upper portion of the moving belt 2. At a downward pivoting of the roller 7, the lower part of the belt 4 next to it is temporarily lowered into the position shown in broken lines in FIG. 3; and, respectively, upon upward movement of the roller 7, the lower part of the belt 4 rises to resume the position shown in solid lines in FIG. 3.

In FIG. 3 there is also shown how the flanks 1 temporarily adhere to the underside of the lower portion of the belt 4 under the adhesive action generated by the device 5; and show the flanks 1 in the overlapping relationship being pressed together at their overlapping end portions between the pair of opposite rotating rollers 8. This process is cyclically repeated so that the overlapping part of the next flank is stuck on to the previous one, and the remaining part of the flank is held to the conveyor belt by means of the suction effect. The overlapping parts of the flanks are pressed together in succession on passing through a pressing roller 8 mounted at the end of the belt. The flanks thus joined to form new material strips are supplied to a winding device (not shown).

The described embodiment represents only one example of a device for carrying out the invention, and variations are of course possible. Thus, the conveyor belt 4 can easily be arranged in hinged fashion.

What we claim is:

1. In a process for joining single fabric cut strips with the air of a conveyor belt and transport means,
   the steps comprising:
   transporting said strips on said transport means to a position below said conveyor belt;
   depressing at least a lower portion of said conveyor belt and releasably making the strips adhere to the under side of said depressed belt portion;
   raising said belt portion while keeping the strip adhered thereto thereby lifting the strip off the transport means;
   timing the movement of the transport means with that of the belt portion so that the next strip to be lifted overlaps with the earlier lifted strip; and
   pressing the overlapping strips together, and thereafter releasing them from the adhesive effect, for subsequent removal.

2. In a process, as claimed in claim 1, the further steps comprising
   imparting and withholding said adhesive effect.

3. In a process, as claimed in claim 1, the further steps comprising
   transporting said strips intermittently on said transport means.

4. A process as claimed in claim 1 in which said strips are diagonally cut flanks of rubberized fabric or the like.

5. A machine for overlapping and in the overlapped position connecting cut strips,
   comprising in combination:
   transport means operative to move said cut strips substantially horizontally;
   a conveyor belt including a continuously moving lower belt portion disposed above said transport means;
   adhesion generating means disposed near said lower belt portion operative to impart an adhesive effect to said lower belt portion;
   lifting means operable to decrease and subsequently to increase the distance between said lower belt portion and said transport means for lifting succeeding strips from said transport means to the underside of said lower belt portion, said adhesion generating means operating to cause said strips removably to adhere to said underside of said continuously moving lower belt portion; and
   roller means disposed at one end of said conveyor belt and operative to press said cut overlapping strips together.

6. A machine, as claimed in claim 5, wherein said lower belt portion moves in a direction substantially parallel to the cut edge of said strips.

7. A machine, as claimed in claim 5, wherein said transport means move said strips in a direction substantially perpendicular to the plane of said cut strips.

8. A machine, as claimed in claim 5, and means to activate and deactivate said adhesion generating means.

9. A machine, as claimed in claim 5, said conveyor belt being porous, said adhesion generating means including suction means disposed above said lower belt portion generating a suction effect through said lower belt portion when activated, to attract and to hold until deactivated said strips.

10. A machine as claimed in claim 5 wherein a roller is provided for pressing together the overlapped parts of said strips.

* * * * *